J. WEIDMANN.
Machine for Beating Silk.

No. 208,502. Patented Oct. 1, 1878.

Witnesses:

Inventor.

3 Sheets—Sheet 2.

J. WEIDMANN.
Machine for Beating Silk.

No. 208,502. Patented Oct. 1, 1878.

Witnesses:
John Inglis
Willis Allen

Inventor
Jacob Weidmann
John Inglis Atty

3 Sheets—Sheet 3.

J. WEIDMANN.
Machine for Beating Silk.

No. 208,502. Patented Oct. 1, 1878.

Witnesses
John Inglis
Max Sehn

Inventor
Jacob Weidmann
John Inglis att'y

UNITED STATES PATENT OFFICE.

JACOB WEIDMANN, OF PATERSON, NEW JERSEY.

IMPROVEMENT IN MACHINES FOR BEATING SILK.

Specification forming part of Letters Patent No. 208,502, dated October 1, 1878; application filed April 1, 1878.

*To all whom it may concern:*

Figure 1:
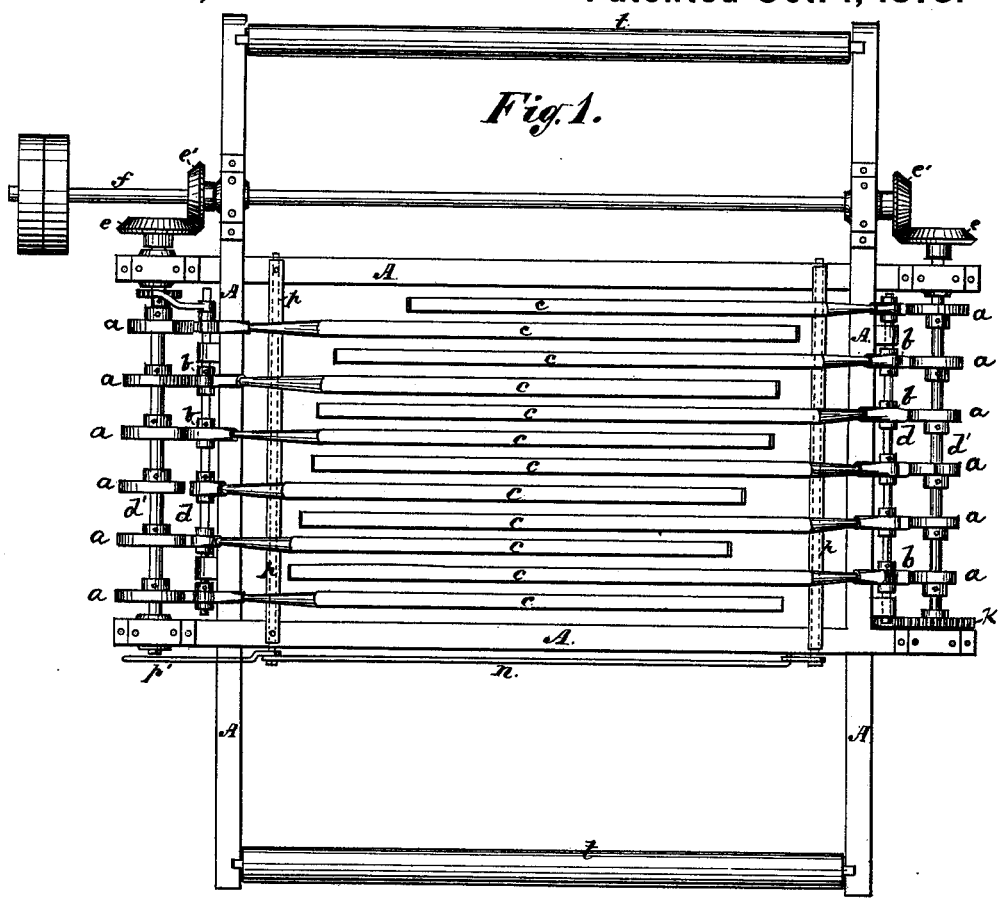
Figure 2:
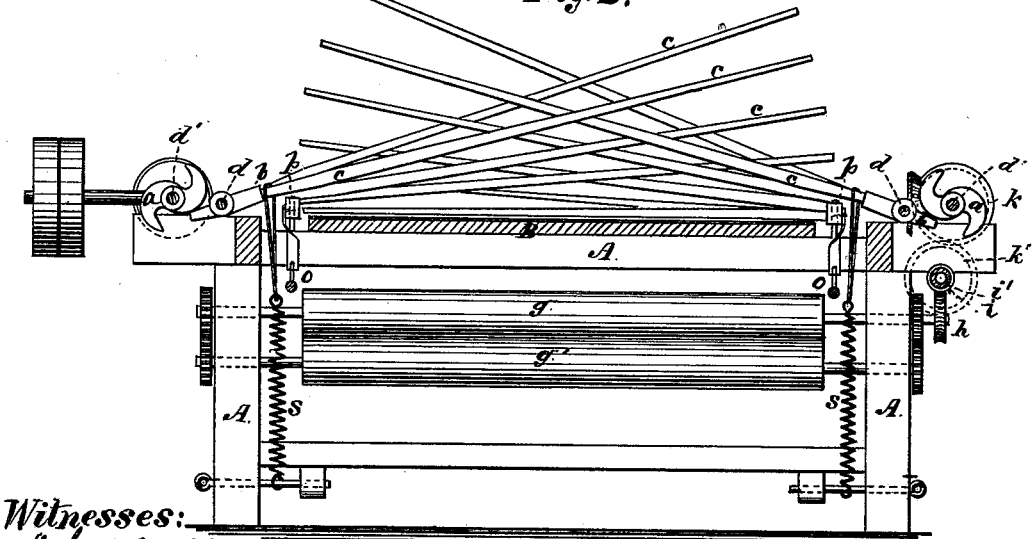
Figure 3:
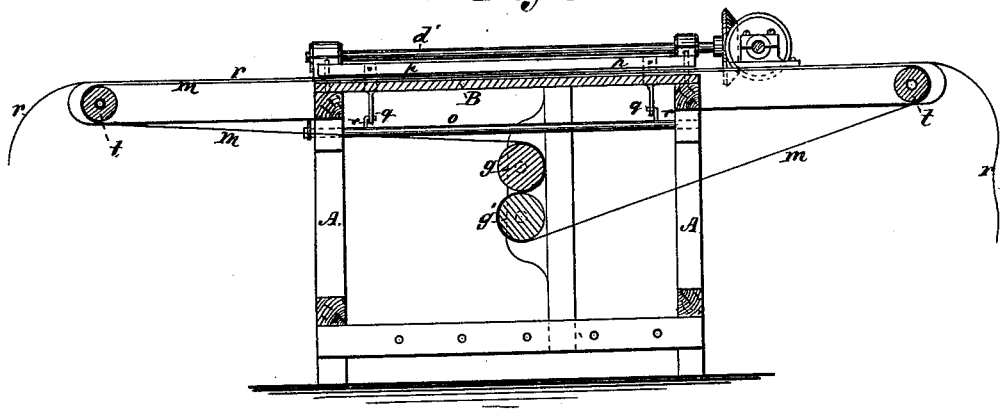
Figure 4:
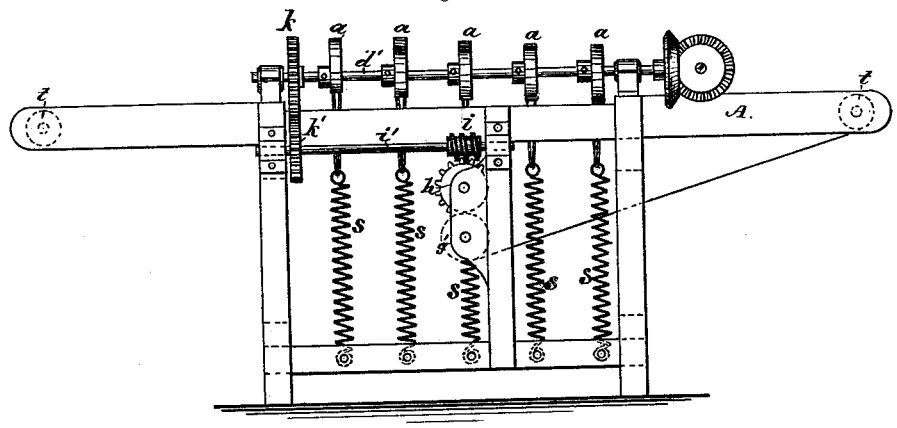
Figure 5:
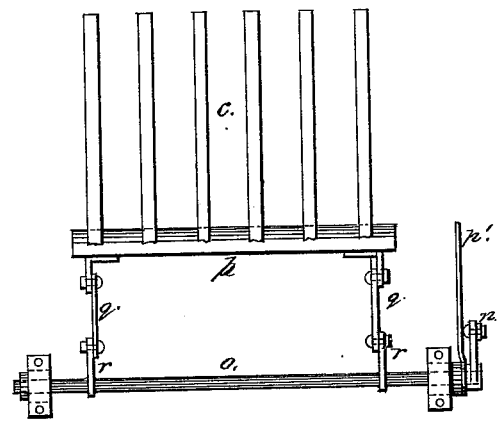

Be it known that I, JACOB WEIDMANN, of the city of Paterson, county of Passaic, and State of New Jersey, have invented a new and useful Improvement in Machines for Beating Silk and other fabrics, of which the following is a specification:

In the accompanying drawing, in which similar letters of reference indicate like parts, Figure 1 is a plan view of a beating-machine having my improvements. Fig. 2 is an end view of the same. Fig. 3 is a central section. Fig. 4 is a side view, and Fig. 5 is a side view, of the lifting-bars in their connection with rocking shaft, showing the flails or beaters in a lifted position, the beaters being broken off near the lifting-bar.

The object of my invention is to provide means whereby the beaters may, when desired, be retained in an elevated position; and to this end consists in the combination and arrangement of devices, as hereinafter specified.

A indicates a wooden frame, in suitable bearings in one end of which is journaled a driving-shaft, $f$, provided with the usual driving-pulleys. On the shaft $f$ are beveled gears $e'$, which engage with similar gears $e$ on the ends of shafts $d'$, on which are arranged a series of cams, $a$, which, in their revolution, are arranged to strike against the ends of short iron levers $b$, pivoted on shaft $d$. Into sockets in levers $b$ are inserted the ends of the beaters $c$.

The cams $a$ on shafts $d'$ are so arranged that the beaters $c$ will be raised in succession, as shown in Fig. 2.

To the beaters $c$ are attached spiral springs $s$, as shown in Figs. 2 and 4, to hasten their downward movements.

The silk or other fabric which is to be subjected to the action of the beaters is carried along on an endless apron, $m$, running over rollers $t\ t$ and over and partly around rollers $g\ g'$, which apron receives its motion by frictional contact with the rollers $g\ g'$, which, in their turn, are driven from one of the shafts $d'$ by means of gears $k$ and $k'$, shaft $i'$, worm $i$, and worm-wheel $h$, the shafts of the rollers $g\ g'$ being geared together, as shown in Fig. 2.

On each side of the machine beneath the beaters $c$, and near their connection with their operating-levers $b$, are arranged lifting-bars $p$, which hold the beaters in an elevated position when they are not in operation, and when it is desirable that the table B of the machine should be accessible for any purpose. The bars $p$ are provided with lifting-rods $q$, (shown in Fig. 3,) which are attached to short arms $r$ on the rock-shafts $o$. The rock-shafts $q$ are connected together by rod $n$, so that they may be simultaneously operated by the lever $p'$.

By these means both series of beaters may be simultaneously raised from the table of the machine, and by securing the long arm of the lever $p'$ to the leg of the table they may be retained in an elevated position as long as desired.

In the machine described in the foregoing specification I disclaim such features, or their equivalents, as are shown to be old by patent granted to Eben Eaton, March 2, 1869, No. 87,330, and also patent to J. Gerdom, November 5, 1872, No. 132,822; but

What I claim as my invention, and desire to obtain by Letters Patent of the United States, is—

In a machine for beating silk or other fabric, the combination of the lifting-bars $p$, lifting-rods $q$, rocking shafts $o$, having arms $r$, rod $n$, and lever $p'$, substantially as shown and described.

JACOB WEIDMANN.

Witnesses:
 JOHN INGLIS,
 MAX JEHU.